United States Patent [19]

Dalton

[11] Patent Number: 5,353,516
[45] Date of Patent: Oct. 11, 1994

[54] TURBINE PACKING RING MEASURING DEVICE

[75] Inventor: William S. Dalton, Chesterfield, Mass.

[73] Assignee: IMO Industries, Inc., Quabbin Division, Chicopee, Mass.

[21] Appl. No.: 14,140

[22] Filed: Feb. 5, 1993

[51] Int. Cl.⁵ ............................. G01B 5/14; G01B 3/18
[52] U.S. Cl. ..................................... 33/821; 33/833; 33/555; 33/549
[58] Field of Search ............... 33/821, 813, 814, 823, 33/825, 831, 832, 833, 838, 549, 555

[56] References Cited

U.S. PATENT DOCUMENTS

| | | | |
|---|---|---|---|
| 760,106 | 5/1904 | Curtis | 33/833 |
| 799,533 | 9/1905 | Clark | 33/833 |
| 1,103,265 | 7/1914 | Corff | 33/567 |
| 1,639,494 | 8/1927 | Flanders | 33/833 |
| 2,636,279 | 4/1953 | Tornebohm | 33/567 |
| 2,941,303 | 6/1960 | Middlestadt | 33/549 |
| 3,114,976 | 12/1963 | Rantsch | 33/813 |
| 3,170,242 | 2/1965 | Deittrick et al. | 33/821 |
| 3,426,436 | 2/1969 | Perwas | 33/567 |
| 3,496,758 | 2/1970 | Sunnen | 33/821 |
| 4,993,167 | 2/1991 | Durfee, Jr. | 33/821 |
| 5,097,604 | 3/1992 | Brown | 33/832 |

FOREIGN PATENT DOCUMENTS 1458683 2/1989 U.S.S.R. ............................. 33/813

Primary Examiner—Christopher W. Fulton
Attorney, Agent, or Firm—Ross, Ross & Flavin

[57] ABSTRACT

The invention comprises a measuring device for turbine packing rings which may be used for measuring the critical distance from the free ends of the packing ring teeth to the packing ring hook fit slot.

1 Claim, 1 Drawing Sheet

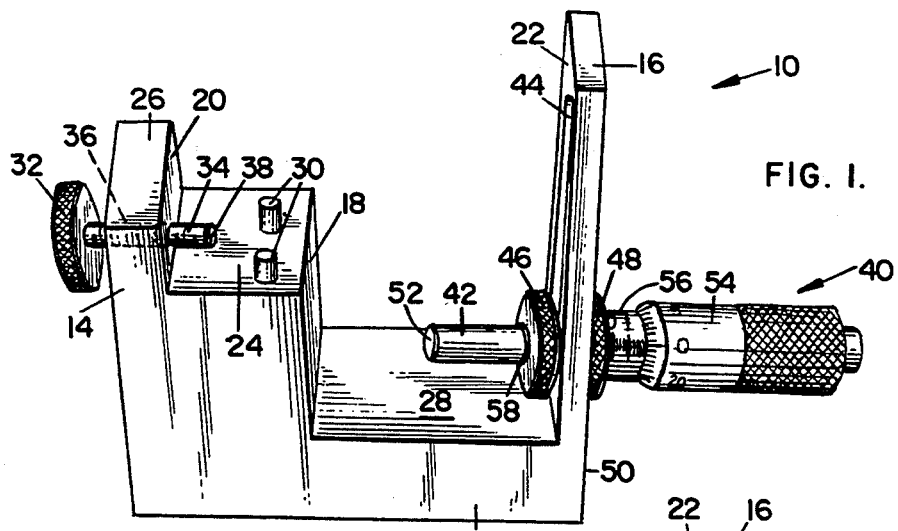
FIG. 1.
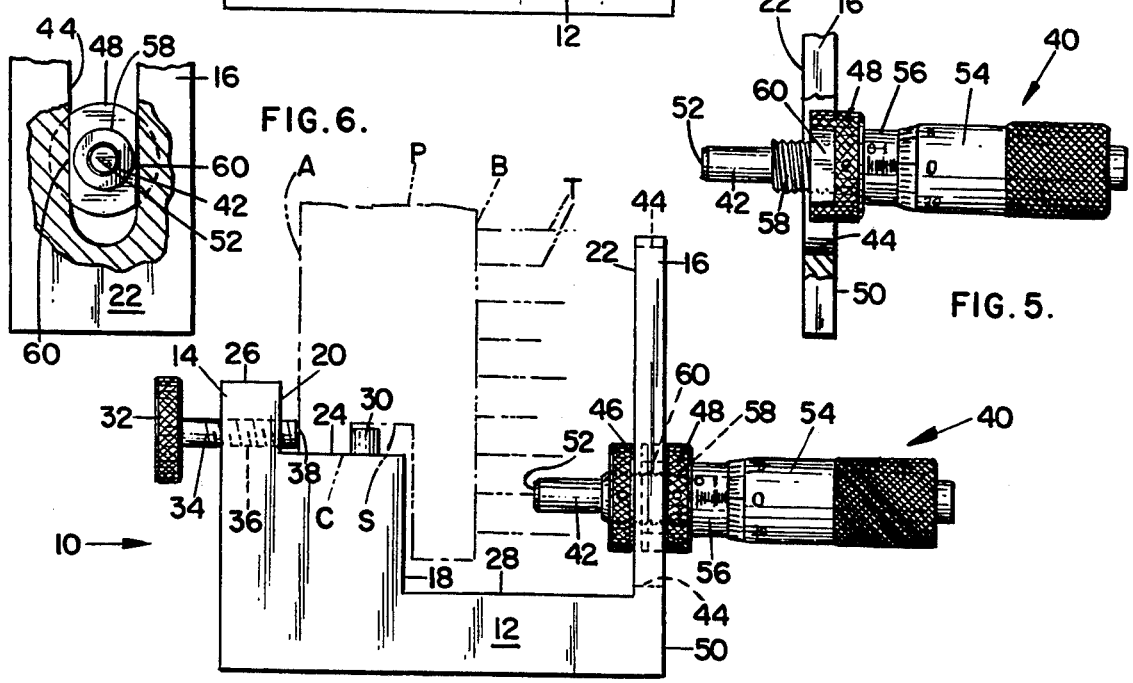
FIG. 6.
FIG. 5.
FIG. 2.
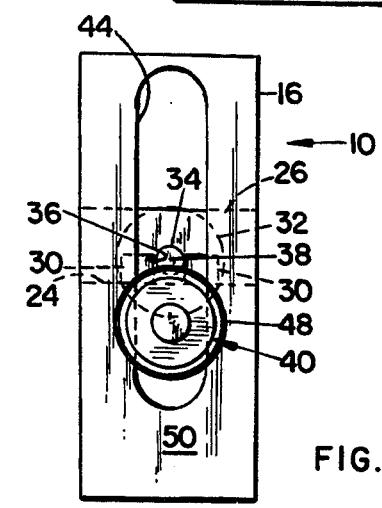
FIG. 3.
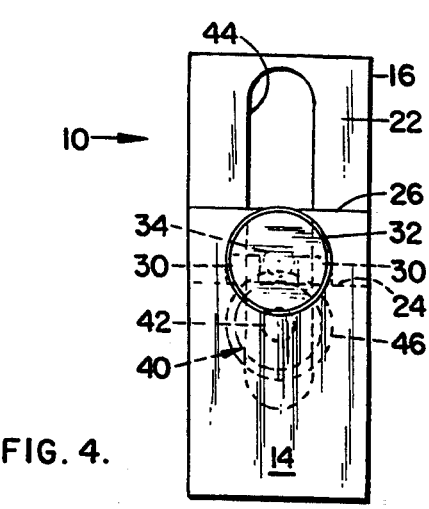
FIG. 4.

TURBINE PACKING RING MEASURING DEVICE

BACKGROUND OF THE INVENTION

1. Field of the Invention

The invention relates to measuring devices which may be fixed to a workpiece for measuring a specific distance.

2. Description of the Prior Art

A wide variety of measuring devices are available in the prior art. However, to my knowledge, no such devices are available for use with packing rings as used in turbines and the like for measuring the critical distance from the free ends of the packing ring teeth to the packing ring hook fit slot.

SUMMARY OF THE INVENTION

The invention comprises a measuring device which may be used for measuring the critical distance from the free ends of the packing ring teeth to the packing ring hook fit slot.

BRIEF DESCRIPTION OF THE DRAWINGS

FIG. 1 is a front perspective view of a measuring device embodying a preferred form of the invention;

FIG. 2 is a front elevational view of the measuring device as used in measuring critical tooth dimensions of a turbine packing ring;

FIG. 3 is an end elevational view as seen from the right of FIG. 1;

FIG. 4 is an end elevational view as seen from the left of FIG. 1;

FIG. 5 is a fragmentary side elevational view of the micrometer of the measuring device with parts broken away and other parts omitted for clarity; and FIG. 6 is a fragmentary end elevational view as seen from the left of FIG. 5.

DESCRIPTION OF THE PREFERRED EMBODIMENT

The measuring device of the invention includes a frame 10 having a flat, horizontally-extending base wall 12 and spaced, parallel end walls 14 and 16 which extend vertically upwardly from opposite ends thereof.

A step 18 is formed integrally with base wall 12 and rises vertically upwardly therefrom inwardly of and in spaced parallelism to an inner face 20 of end wall 14 and an inner face 22 of end wall 16.

An upper face 24 of step 18 is disposed below the plane of an upper face 26 of end wall 14 and above the plane of an upper face 28 of base wall 12.

A pair of spaced pins 30 rise vertically upwardly from upper face 24 of step 18.

A horizontally disposed thumb screw 32 has a stem 34 which extends through and is threadedly engaged in an opening 36 in end wall 14, the stem having a free end 38 disposed inwardly of inner face 20 of end wall 14 and on a plane with pins 30.

Appropriate rotation of thumb screw 32 moves free end 38 of stem 34 toward and away from pins 30, for purposes to appear.

A horizontally-disposed calibrated micrometer 40 has a stem 42 which extends through a vertically-disposed through slot 44 provided centrally in end wall 16 stem 42 being disposed in spaced parallelism to upper face 28 of base wall 12 and extending through and being held relative to wall 16 by a pair of inner and outer knurled nuts 46 and 48 respectively disposed thereon at inner face 22 and an outer face 50 respectively of wall 16.

An inner end 52 of stem 42 is disposed in spaced adjacency to step 18, with appropriate rotation of micrometer 40 moving said end toward and away from the step, for purposes to appear.

Micrometer 40 includes an outer rotatable calibrated cylinder 54 which sleeves an inner stationary calibrated cylinder 56 which has an axially aligned exteriorly threaded sleeve 58 extending inwardly therefrom through slot 44 in end wall 16.

A pair of the side faces of the inner half portion of outer knurled nut 48 are cut away or flattened as at 60 to permit the entry of the inner half portion of the nut into slot 44 of end wall 16 when the nut is threaded on sleeve 58, with the bases of flattened portions 60 also serving as stops upon engagement with outer face 50 of end wall 16.

Inner knurled nut 46 is threaded on sleeve 58 so as to contact inner face 22 of end wall 16 and, together with knurled nut 48 when tightened hold micrometer 40 in desired position in slot 44 of end wall 16.

Loosening of inner knurled nut 46 permits movement of the micrometer upwardly or downwardly relative to slot 44 of end wall 16.

The outer end of micrometer stem 42 is fixed relative to micrometer outer calibrated cylinder 54 and passes freely through micrometer inner calibrated cylinder 56 and threaded sleeve 58, wherefore appropriate rotation of outer cylinder 54 effects transverse movement of inner end 52 of micrometer stem 42 toward or away from step 18 of frame 10.

Frame 10 is of appropriate configuration for receiving within its confines a turbine packing ring P of usual construction having spaced, parallel side faces A and B and a hook fit slot S extending inwardly from an end face C thereof.

A plurality of spaced, parallel, staggered teeth T extend outwardly from side face B of packing ring P.

The measuring tool hereof is designed to measure the distance from the free end of a packing ring tooth tip to the inner vertical wall of the packing ring hook fit slot.

This dimension is a most critical one, especially at fit up. Prior to the development of this tool there was no accurate way to field measure this area of the packing ring.

As shown in FIG. 2, packing ring P is positioned in frame 10 so that: pins 30 are disposed in hook fit slot S and bear against the inner vertical wall of the slot for stabilizing the frame relative to the packing ring; packing ring side face A is disposed immediately inwardly of inner face 20 of end wall 14 and free end 38 of thumb screw stem 34; and packing ring side face B is disposed inwardly of step 18 with teeth T facing inner end 52 of micrometer stem 42.

Thumb screw 32 is rotated to bring free end 38 of locking screw stem 34 into contact with packing ring side face B to firmly lock the inner vertical wall of hook fit slot S against pins 30.

Calibrated micrometer 40 is slid upwardly or downwardly relative to end wall 16 of frame 10 so as to bring micrometer stem 42 into alignment with one of the teeth of the packing ring and outer cylinder 54 of the micrometer is rotated to bring free end 52 of micrometer stem 42 into contact with the free end of one of the teeth T of the packing ring to produce a precise distance reading on the micrometer.

The teeth are measured by the calibrated micrometer which is moved from tooth to tooth across the face of the packing ring. Thumb screw 32 is then loosened and another area of the ring can be measured.

I claim:

1. A measuring device for measuring the distance between the hook fit slot and the free ends of the packing ring teeth of a turbine packing ring having a hook fit slot and a plurality of teeth comprising: a frame having stabilizing means for engagement with the packing ring hook fit slot, the stabilizing means being a pair of pins on the frame, locking means comprising a thumb-screw on the frame for locking the packing ring relative to the frame, and a calibrated micrometer on the frame for measuring the distance between the packing ring hook fit slot and the free ends of the packing ring teeth, the calibrated micrometer being slidably adjustable relative to the frame and comprising an outer rotatable calibrated cylinder, an inner stationary calibrated cylinder sleeved by the outer cylinder and having an axially aligned exteriorly threaded sleeve extending outwardly therefrom, a micrometer stem fixed at one end relative to the outer cylinder and passing freely through the inner cylinder and threaded sleeve and locking means on the threaded sleeve for locking the micrometer relative to the frame, wherefore appropriate rotation of the outer cylinder effects transverse movement of the micrometer stem relative to the frame.

* * * * *